(12) United States Patent
Schenker et al.

(10) Patent No.: US 11,207,965 B2
(45) Date of Patent: Dec. 28, 2021

(54) MOTOR VEHICLE WITH TRANSMISSION AND TRANSMISSION FLUID PUMP

(71) Applicant: AUDI AG, Ingolstadt (DE)

(72) Inventors: Mario Schenker, Ingolstadt (DE); Ralf Kischkat, Gaimersheim (DE); Wilhelmus Gieles, Wettstetten (DE); Lionel Dumont, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 212 days.

(21) Appl. No.: 15/485,971

(22) Filed: Apr. 12, 2017

(65) Prior Publication Data

US 2017/0217299 A1    Aug. 3, 2017

Related U.S. Application Data

(62) Division of application No. 13/416,621, filed on Mar. 9, 2012, now Pat. No. 9,651,143.

(30) Foreign Application Priority Data

Mar. 10, 2011    (DE) ...................... 10 2011 013 487.5

(51) Int. Cl.
*B60K 6/365* (2007.10)
*B60K 25/02* (2006.01)
(Continued)

(52) U.S. Cl.
CPC .............. *B60K 6/365* (2013.01); *B60K 6/383* (2013.01); *B60K 6/48* (2013.01); *B60K 25/02* (2013.01); *F16H 3/724* (2013.01); *F16H 57/0439* (2013.01); *F16H 61/0028* (2013.01); *B60K 2006/4816* (2013.01); *B60K 2025/005* (2013.01); *B60K 2025/022* (2013.01); *B60Y 2200/92* (2013.01); *B60Y 2400/427* (2013.01); *B60Y 2400/73* (2013.01);
(Continued)

(58) Field of Classification Search
CPC .......................... F16H 61/0028; F16H 57/0439
See application file for complete search history.

(56) References Cited

U.S. PATENT DOCUMENTS 4,418,777 A * 12/1983 Stockton ............. F16H 57/0413
                                              180/65.6
5,147,254 A    9/1992 Baier et al.
(Continued)

FOREIGN PATENT DOCUMENTS

DE        4024063 A1    1/1992
DE     198 10 374 A1    9/1999
(Continued)

*Primary Examiner* — Charles A Fox
(74) *Attorney, Agent, or Firm* — Maier & Maier, PLLC

(57) ABSTRACT

A motor vehicle includes a transmission and a transmission fluid pump for transport of transmission oil to and within the transmission. The transmission fluid pump has a moving element which is coupled to a summation shaft of a planetary gear train. The planetary gear train has a ring gear which is operated by a first drive, and a sun gear which is operated by a second drive. A freewheel mechanism is arranged between the sun gear or a shaft connected to the sun gear and a further element so that the second drive can be switched off, when the first drive operates at high speeds while yet maintaining proper operation of the transmission fluid pump.

6 Claims, 2 Drawing Sheets

(51) Int. Cl.
  *F16H 57/04* (2010.01)
  *F16H 61/00* (2006.01)
  *B60K 6/383* (2007.10)
  *B60K 6/48* (2007.10)
  *F16H 3/72* (2006.01)
  *B60K 25/00* (2006.01)
(52) U.S. Cl.
  CPC ..... *F16H 2200/2005* (2013.01); *Y10S 903/91* (2013.01); *Y10S 903/913* (2013.01)

(56) References Cited

U.S. PATENT DOCUMENTS

| | | | | |
|---|---|---|---|---|
| 5,418,400 | A * | 5/1995 | Stockton | F02N 11/04 290/22 |
| 5,427,196 | A * | 6/1995 | Yamaguchi | B60K 1/00 180/65.21 |
| 5,558,173 | A | 9/1996 | Sherman | |
| 5,799,744 | A | 9/1998 | Yamaguchi et al. | |
| 5,823,282 | A | 10/1998 | Yamaguchi | |
| 6,306,057 | B1 | 10/2001 | Morisawa et al. | |
| 6,845,832 | B2 | 1/2005 | Takizawa et al. | |
| 8,196,724 | B2 * | 6/2012 | Samie | B60K 6/383 192/43.1 |
| 8,226,516 | B2 * | 7/2012 | Swales | B60K 6/48 475/5 |
| 8,267,231 | B2 * | 9/2012 | Holmes | B60K 6/50 192/43.1 |
| 2001/0020789 | A1 | 9/2001 | Nakashima | |
| 2002/0060099 | A1 * | 5/2002 | Takenaka | B60K 6/365 180/65.1 |
| 2003/0104900 | A1 | 6/2003 | Takahashi et al. | |
| 2004/0176203 | A1 * | 9/2004 | Supina | B60K 6/365 475/8 |
| 2006/0019786 | A1 * | 1/2006 | Asa | F01C 17/02 475/5 |
| 2009/0095548 | A1 | 4/2009 | Tamba et al. | |
| 2009/0205886 | A1 * | 8/2009 | Supina | B60K 6/365 180/65.22 |
| 2009/0247341 | A1 * | 10/2009 | Abe | B60K 6/26 475/5 |
| 2013/0221778 | A1 * | 8/2013 | Kusase | H02K 7/108 310/78 |
| 2013/0274047 | A1 * | 10/2013 | Gotz | B60K 6/383 475/5 |

FOREIGN PATENT DOCUMENTS

| | | |
|---|---|---|
| DE | 103 29 215 A1 | 1/2005 |
| DE | 10 2007 039 083 A1 | 2/2009 |
| DE | 10 2010 001 259 A1 | 2/2011 |
| EP | 1 197 371 A2 | 4/2002 |
| JP | 2010208587 A | 9/2010 |
| WO | WO 2010/142042 A1 | 12/2010 |

* cited by examiner

MOTOR VEHICLE WITH TRANSMISSION AND TRANSMISSION FLUID PUMP

CROSS-REFERENCES TO RELATED APPLICATIONS

This application is a divisional of prior filed copending U.S. patent application Ser. No. 13/416,621, filed Mar. 9, 2012, the priority of which is hereby claimed under 35 U.S.C. .sctn. 120, and which claims the priority of German Patent Application, Serial No. 10 2011 013 487.5, filed Mar. 10, 2011, pursuant to 35 U.S.C. 119(a)-(d).

The contents of U.S. patent application Ser. No. 13/416,621 and German Patent Application, Serial No. 10 2011 013 487.5 are incorporated herein by reference in their entireties as if fully set forth herein.

BACKGROUND OF THE INVENTION

The present invention relates to a motor vehicle with transmission and transmission fluid pump.

The following discussion of related art is provided to assist the reader in understanding the advantages of the invention, and is not to be construed as an admission that this related art is prior art to this invention.

A transmission fluid pump is provided to transport transmission oil to and within a transmission of the motor vehicle. A moving element of the transmission fluid pump is normally driven directly by the drive of the vehicle, typically the internal combustion engine. To design the transmission fluid pump as compact as possible, it has been proposed to merely convey sufficient oil, when the internal combustion engine operates at a middle to higher speed, but to cut the delivery of oil, when the internal combustion engine operates at a lower speed or in particular at idling speed. In order to deliver sufficient oil also when the internal combustion engine operates at idling speed, a further drive is provided to increase the speed of the pump when the idling speed is too low.

As the internal combustion engine and the additional drive, normally an electric motor, has to be coupled with the pump, the use of a summing gear set, in particular a planetary gear train, has been proposed. The moving element of the pump is hereby coupled with the summation shaft, i.e. the planet carrier, of the planetary gear train, when a simple planetary gear set is involved. The other components are coupled with the two drives, typically the ring gear with the internal combustion engine, when a simple planetary gear set is involved, and the sun gear with the electric motor.

When the internal combustion engine rotates faster than the electric motor, the sun gear is caused to move in relation to the planet carrier. This relative movement is undesired. Thus, the electric motor has to normally run continuously therewith so that the transmission fluid pump is operated by the internal combustion engine at the desired speed. There is thus room for saving energy when operating the electric motor.

It would therefore be desirable and advantageous to address prior art shortcomings and to allow operation of a transmission fluid pump for a motor vehicle at less energy.

SUMMARY OF THE INVENTION

According to one aspect of the present invention, a motor vehicle includes a transmission, a transmission fluid pump for transport of transmission oil to and within the transmission, with the transmission fluid pump having a moving element, a planetary gear train having a summation shaft coupled with the moving element, with the planetary gear train having a first driveshaft and a second driveshaft, a first drive for operating the first driveshaft, a second drive for operating the second driveshaft, and a freewheel mechanism arranged between one of the first and second drives or a shaft coupled to said one drive, and a further element.

The present invention resolves prior art problems through the presence of a freewheel between one of the first and second drives or the shaft coupled to this drive, and the further element. Currently preferred is the arrangement of the freewheel mechanism between the second drive and the further element. The provision of the freewheel mechanism eliminates the need for operating the one drive, when the other drive operates the transmission fluid pump.

According to another advantageous feature of the present invention, the first drive may be an internal combustion engine of the motor vehicle. The second drive may be an electric motor.

Advantageously, the freewheel mechanism is arranged between a sun gear of the planetary gear train or a shaft connected to the sun gear and the further element. The freewheel mechanism locks up the sun gear, even when the electric motor is switched off. As a result, the electric motor can be switched off, while still maintaining the desired speed of the moving element of the transmission fluid pump, when the moving element is intended to be operated solely by the internal combustion engine.

According to another advantageous feature of the present invention, the further element may be a housing of the transmission. As an alternative, the further element may be a housing of the electric motor. Either housing is sufficiently stable to allow lockup of the sun gear.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
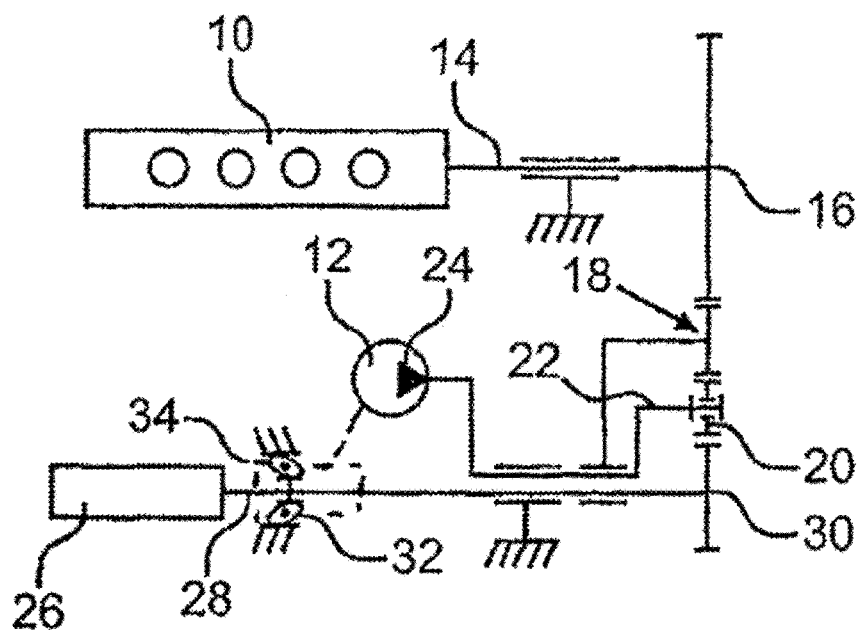
FIG. 1 is a schematic illustration of relevant components of a motor vehicle, showing features of one embodiment of the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
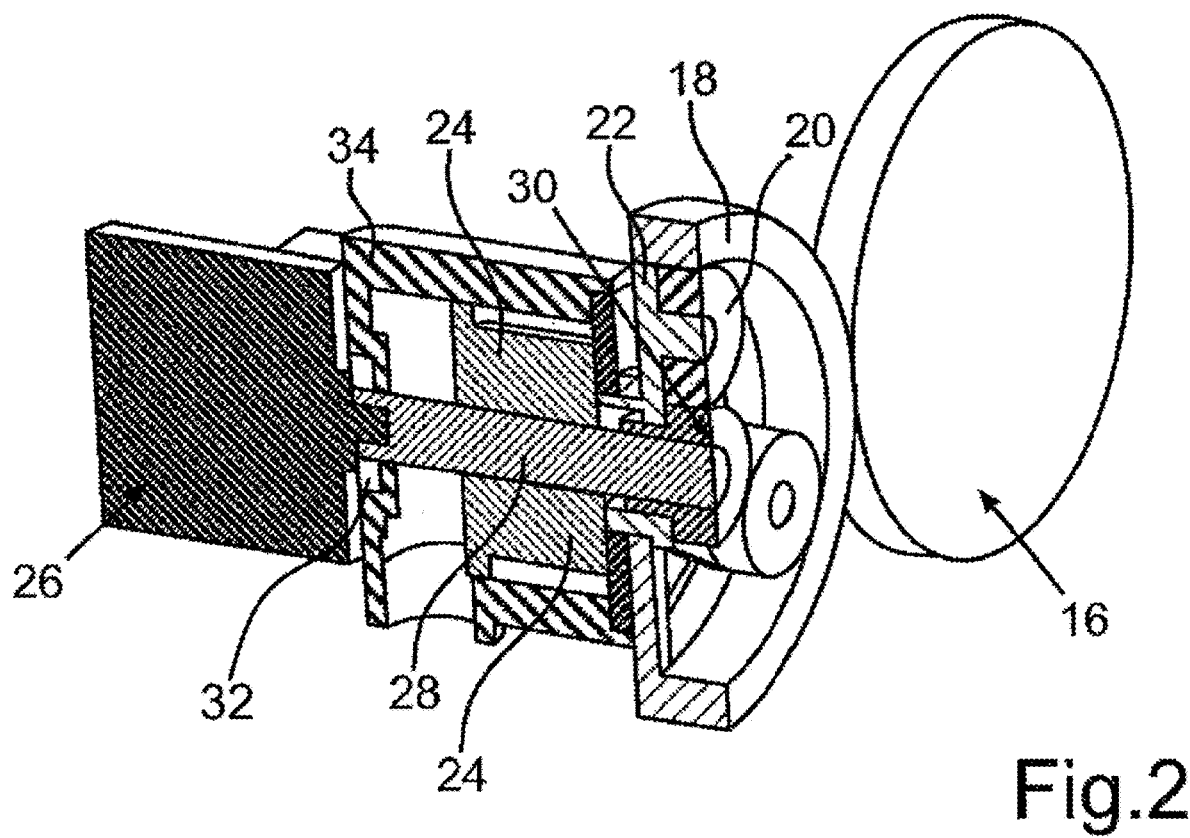
FIG. 2 is a partly sectional view of the components of FIG. 1 by way of a perspective illustration.

Turning now to the drawing, and in particular to FIG. 1, there is shown a schematic illustration of relevant components of a motor vehicle, showing features of the present invention. The motor vehicle has an internal combustion engine 10 and a transmission fluid pump 12 which is operated by the internal combustion engine 10 to run for example at speeds between 0 and 42000 rpm. This is implemented by coupling an output shaft 14 of the internal combustion engine 10 with an output gear 16 in mesh with a ring gear 18 of a planetary gear train. The planetary gear train has a plurality of planetary gears 20 which are rotatably mounted on a planet carrier 22, as shown in FIG. 2. The planet carrier 22 is connected to a moving element 24 of the transmission fluid pump 12.

Figure 3:
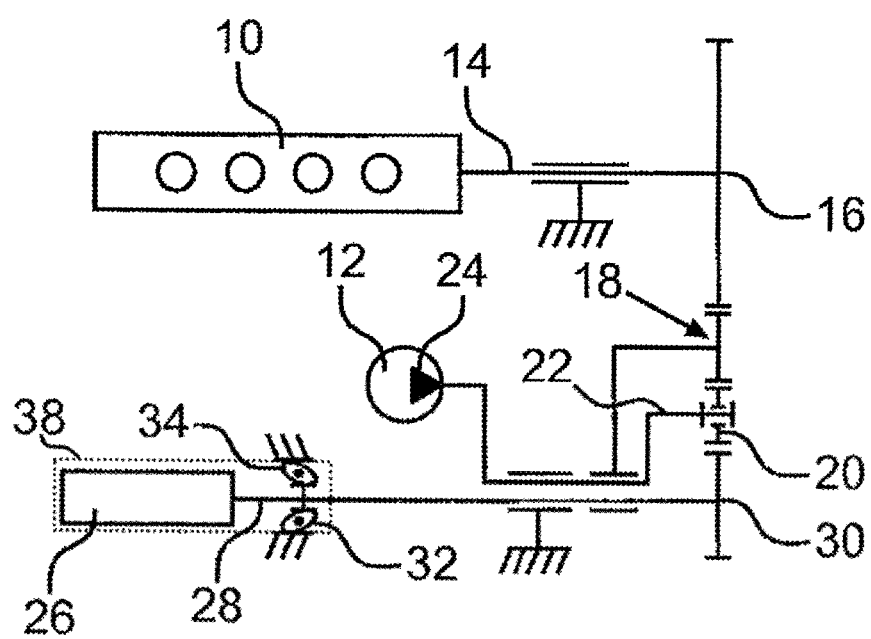
FIG. 3 is a schematic illustration of relevant components of a motor vehicle according to an alternative exemplary embodiment.

In order to keep the transmission fluid pump 12 as compact as possible, an electric motor 26 is provided to operate the moving element 24 of the transmission fluid pump 12 at a sufficient speed, when the internal combustion engine 10 operates at low speeds, e.g. in a range between the idling speed, e.g. 700 rpm, up to about 2000 rpm. The electric motor 26 has an output shaft 28 which is connected to a sun gear 30 of the planetary gear train. In order to be able to shut down the electric motor 26 and to prevent the sun gear 30 to rotate, when the internal combustion engine 10 operates at high speeds, e.g. in a range above 4000 rpm (Otto engines) up to a maximum speed (cutoff speed), a freewheel mechanism 32 is arranged between the sun gear 30, i.e. the output shaft 28, and the transmission housing 34. FIG. 3 shows a variant in which the freewheel mechanism 32 is arranged between the output shaft 28 and the electric motor 26, more particularly between the output shaft 28 and a housing component 38 of the electric motor 26.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle, comprising:
    a transmission fluid pump for transport of transmission oil to and within a transmission of the motor vehicle, said transmission fluid pump having a moving element;
    a planetary gear train having a summation shaft coupled with the moving element, said planetary gear train having a first driveshaft connected to an internal combustion engine of the motor vehicle and a second driveshaft connected to an electric motor of the motor vehicle, the electric motor comprising an electric motor housing;
    a freewheel mechanism, the freewheel mechanism connected in a first connection on an inner circumference of the freewheel mechanism, directly without intervening elements, to the second driveshaft operated by the electric motor, and connected in a second connection on a first side portion of the freewheel mechanism, directly without intervening elements, to the electric motor housing, said freewheel mechanism having a second side portion facing a transmission housing and not connected to the transmission housing.

2. The motor vehicle of claim 1, wherein the freewheel mechanism is located between the internal combustion engine or the first driveshaft operated by the internal combustion engine and the housing of the transmission.

3. The motor vehicle of claim 1, wherein the freewheel mechanism is located between the internal combustion engine or the shaft operated by the internal combustion engine and the housing of the electric motor.

4. The motor vehicle of claim 1, wherein the freewheel mechanism is located between the electric motor and the housing of the transmission.

5. The motor vehicle of claim 1, wherein the planetary gear train has planetary gears, a planet carrier rotatably supporting the planetary gears and connected to the moving element of the transmission fluid pump, a ring gear operably connected to the first driveshaft, and the sun gear operably connected to the second driveshaft.

6. A motor vehicle, comprising:
    a transmission fluid pump for transport of transmission oil to arid within a transmission of the motor vehicle, said transmission fluid pump having a moving element;
    a planetary gear train having a summation shaft coupled with the moving element, said planetary gear train having a first driveshaft and a second driveshaft;
    a first drive which is an internal combustion engine of the motor vehicle for operating the first driveshaft;
    a second drive which is an electric motor of the motor vehicle for operating the second driveshaft, the electric motor of the motor vehicle comprising an electric motor housing; and
    a freewheel mechanism, the freewheel mechanism connected, in a first connection on an inner circumference of the freewheel mechanism, directly without intervening elements, to the second driveshaft, the second driveshaft being operated by the electric motor, and connected, in a second connection on a first side portion of the freewheel mechanism, directly without intervening elements, to the electric motor housing, said freewheel mechanism having a second side portion facing a transmission housing and not connected to the transmission housing.

* * * * *